(12) United States Patent
Ota

(10) Patent No.: US 7,954,473 B2
(45) Date of Patent: Jun. 7, 2011

(54) VEHICLE, CONTROLLER AND CONTROL METHOD THEREFOR, AND ABNORMALITY DETECTION SYSTEM FOR IDLE SPEED CONTROL DEVICE AND ABNORMALITY DETERMINING METHOD FOR IDLE SPEED CONTROL DEVICE

(75) Inventor: Tomohiko Ota, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 646 days.

(21) Appl. No.: 12/022,985

(22) Filed: Jan. 30, 2008

(65) Prior Publication Data

US 2008/0178838 A1 Jul. 31, 2008

(30) Foreign Application Priority Data

Jan. 31, 2007 (JP) .................................. 2007-021243
Nov. 22, 2007 (JP) .................................. 2007-302502

(51) Int. Cl.
*F02D 41/22* (2006.01)
*F02M 3/09* (2006.01)
(52) U.S. Cl. ................................ 123/339.1; 123/339.15

(58) Field of Classification Search ............. 123/339.23, 123/339.15, 339.1, 339.14, 339.19; 73/118.1, 73/118.2, 116; 701/103, 29
See application file for complete search history.

(56) References Cited

U.S. PATENT DOCUMENTS 5,936,152 A * 8/1999 Nishioka et al. ............ 73/114.25
6,446,499 B1 * 9/2002 Inoue ......................... 73/114.37

FOREIGN PATENT DOCUMENTS

JP 59-046353 3/1984
JP 64-24132 A * 1/1989

* cited by examiner

*Primary Examiner* — Hieu T Vo
(74) *Attorney, Agent, or Firm* — Rabin & Berdo, PC

(57) ABSTRACT

A vehicle speed sensor detects a rotational speed of a rear wheel. A throttle valve is positioned downstream of an intake pipe. An idle speed control device controls the amount of air flowing through the intake pipe to perform an idle speed control. An electronic control unit (ECU) detects an abnormality of the idle speed control (ISC) device based on an intake pipe pressure. The ECU inhibits a rotational speed of the engine from increasing when an abnormality of the ISC device is determined. Precise detection of vehicle speed and suppression of increase of engine rotational speed resulting from an ISC abnormality is thereby achieved.

15 Claims, 10 Drawing Sheets

VEHICLE, CONTROLLER AND CONTROL METHOD THEREFOR, AND ABNORMALITY DETECTION SYSTEM FOR IDLE SPEED CONTROL DEVICE AND ABNORMALITY DETERMINING METHOD FOR IDLE SPEED CONTROL DEVICE

RELATED APPLICATIONS

This application claims the benefit of priority under 35 USC 119 of Japanese patent application no. 2007-021243, filed on Jan. 31, 2007, and Japanese patent application no. 2007-302502, filed on Nov. 22, 2007, which applications are hereby incorporated by reference in their entireties.

BACKGROUND OF THE INVENTION

1. Field of the Invention

The present invention relates to an abnormality detection system and method of detecting an abnormality for an idle speed control device of a vehicle.

2. Description of Related Art

Vehicles having idling rotational speed control or "idle speed control" (ISC) are known (for example, see JP-A-Sho 59-46353). ISC adjusts an idling rotational speed by increasing or decreasing an amount of intake air supplied to an engine.

If any abnormality occurs in an ISC device that increases ISC and an intake air amount, the engine rotational speed can become too great. In order to inhibit engine speed from increasing, a control for inhibiting engine speed from increasing can be made together with the ISC.

One method for inhibiting increase of engine speed resulting from ISC abnormality, is to decrease engine speed by reducing supplied fuel, delaying ignition times or combining these methods if the following conditions (1)-(4) are satisfied:

(1) a throttle opening is equal to or less than a predetermined opening;

(2) a vehicle speed is equal to or lower than a predetermined vehicle speed;

(3) an engine speed is equal to or higher than a predetermined rotational speed; and (4) not under a condition that the supplied fuel is going to be reduced.

Vehicles equipped with an electronic continuously variable transmission (ECVT) in which more precise vehicle speed is required are known. In a vehicle controlled using vehicle speed, a vehicle speed sensor preferably detects a rotational speed of a drive wheel.

However, when a vehicle speed sensor detecting the rotational speed of the drive wheel is used, it is difficult to properly practice the method for inhibiting increase of engine speed resulting from ISC abnormality. This is because if the vehicle speed sensor is just placed to face the drive wheel, vehicle speed is detected even though the vehicle is in a standstill state under an idling condition, such as when the drive wheel is held using a center stand and does not contact the ground.

In view of the above problem, placing a vehicle speed sensor to face a driven wheel and another vehicle speed sensor to face the drive wheel has been considered. Thereby, both control for inhibiting increase of engine speed resulting from ISC and ISC abnormality, and accurate control of the vehicle are practicable.

Another method is to place a vehicle speed sensor for the drive wheel and a center stand sensor detecting that the center stand is in use when the center stand sensor detects use of the center stand, the vehicle speed is determined to be zero even though the vehicle speed sensor placed for the drive wheel detects a vehicle speed. Thereby, the drawback of inhibiting engine speed from increasing resulting from idling of the drive wheel is removed.

However, use of multiple speed sensors or a separate center stand sensor complicate the control and structure of the vehicle.

SUMMARY OF THE INVENTION

The present invention is made under these circumstances and achieves both precise detection of vehicle speed and suppression of increase of engine rotational speed resulting from an ISC abnormality, without a complicated structure.

A vehicle according to the invention includes a drive wheel is driven by power of an engine. A vehicle speed sensor detects a rotational speed of the drive wheel. An intake pipe supplies air to the engine. An intake pipe pressure sensor detects a pressure in the intake pipe. An intake valve is located further away from the engine than the intake valve. The intake valve adjusts a flow passage area of the intake pipe. An idle speed control device performs idle speed control that controls idling rotational speed by controlling an amount of air that flows through the intake pipe. The controlling unit detects an abnormality of the idle speed control device based on the pressure in the intake pipe detected by the intake pipe pressure sensor. The controlling unit suppresses increase of engine speed when an abnormality in the idle speed control device is detected.

Another vehicle according to the invention includes an electronic continuously variable transmission having an input shaft connected to an engine and an output shaft connected to a drive wheel. A change-gear ratio between the input and output shafts is continuously controlled. A vehicle speed sensor detects a rotational speed of the drive wheel. An intake pipe supplies air to the engine. An intake pipe pressure sensor detects a pressure in the intake pipe. An intake valve is located further away from the engine than the intake pipe pressure sensor in the intake valve. The intake valve adjusts a flow passage area of the intake pipe. An idle speed control device performs idle speed control that controls idling rotational speed by controlling the amount of air that flows through the intake pipe. The controlling unit detects an abnormality in the idle speed control device based on the pressure in the intake pipe detected by the intake pipe pressure sensor. The control section suppresses increase of engine speed when the abnormality in the idle speed control device is detected.

A controller according to the invention is provided for a vehicle having an intake pipe for supplying air to an engine, an intake pipe pressure sensor, and an idle speed control device that controls an idling rotational speed by controlling the amount of air that flows through the intake pipe. The controller detects an abnormality of the idle speed control device based on a pressure in the intake pipe detected by the intake pipe pressure sensor and suppresses increase of engine speed when an abnormality of the idle speed control device is detected.

An abnormality detection system according to the invention is provided for an idle speed control device in a vehicle having an intake pipe supplying air to an engine and an intake pipe pressure sensor. The abnormality detection system detects an abnormality of the idle speed control device based on a pressure in the intake pipe detected by the intake pipe pressure sensor.

A method according to the invention is provided for controlling a vehicle having an intake pipe supplying air to an engine, an intake pipe pressure sensor and an idle speed control device that controls an idling rotational speed by controlling an amount of air that flows through the intake pipe. The method comprises detecting an abnormality of the idle speed control device based on a pressure in the intake pipe detected by the intake pipe pressure sensor, and suppressing increase of a rotational speed of the engine when an abnormality of the idle speed control device is detected.

A method according to the invention is provided for detecting an abnormality of an idle speed control device in a vehicle having an intake pipe supplying air to an engine and an intake pipe pressure sensor The method comprises detecting an abnormality based on a pressure in the intake pipe detected by the intake pipe pressure sensor.

According to the present invention, both precise detection of vehicle speed and suppression of increase of rotational speed of an engine resulting from an ISC abnormality are achieved without a complicated structure.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiment 1

<<Outline of Embodiment>>

In a vehicle having a vehicle speed sensor detecting a rotational speed of a drive wheel to control the vehicle based on vehicle speed, precise detection of vehicle speed and suppression of increase of engine rotational speed resulting from ISC abnormality are achieved by detecting the ISC abnormality, not based on vehicle speed, but upon intake pipe pressure without a complicated structure.

Figure 1:
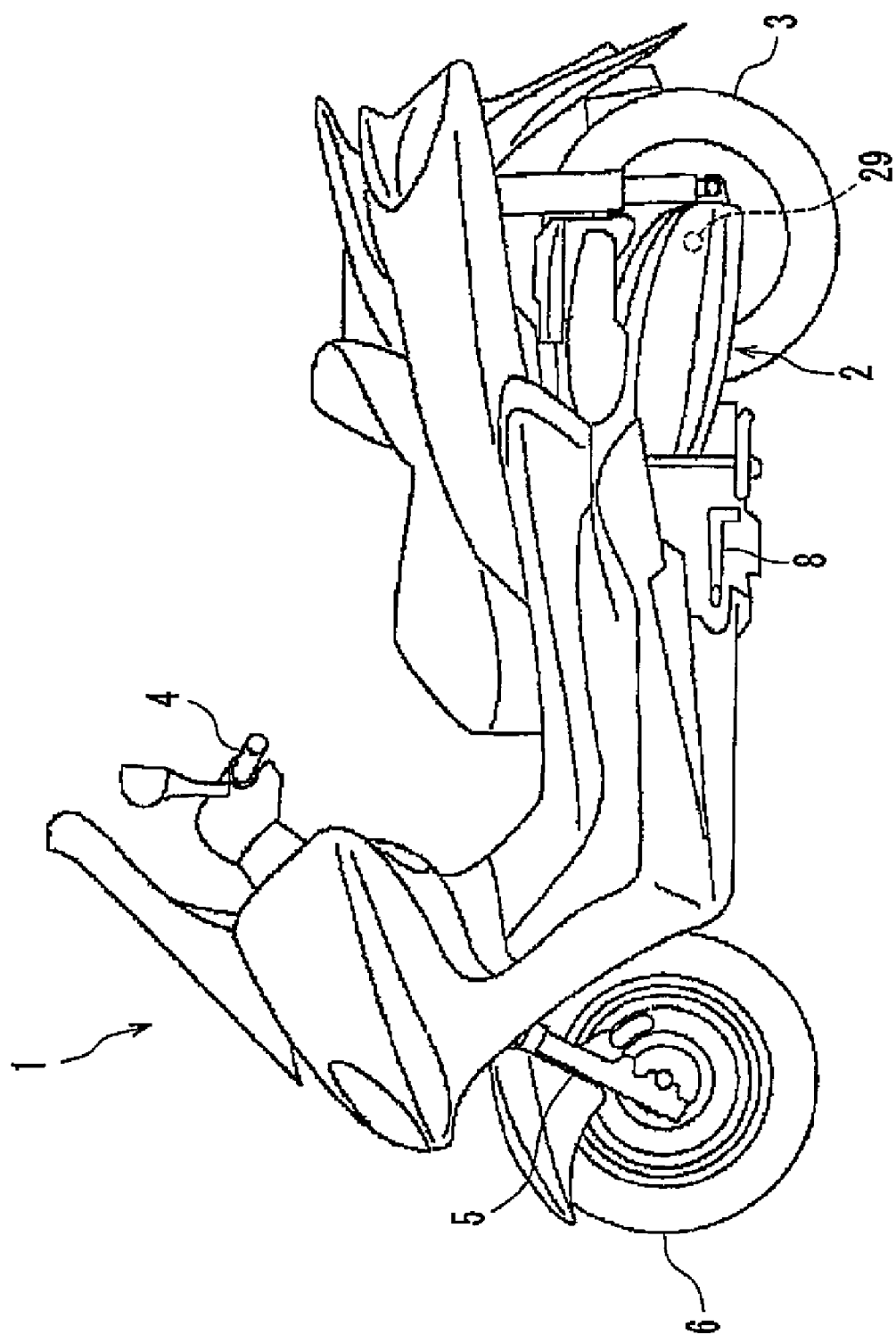
FIG. 1 is a side view of a two-wheeled motorized vehicle embodying the present invention.

An embodiment of the invention is described using a two-wheeled motorized vehicle 1 shown in FIG. 1 as an example. While vehicle 1 is a scooter-type vehicle, the invention is not limited to a scooter-type vehicle and may be, for example, an off-road type, a motorcycle type, a scooter type or a moped type. Also, the vehicle may be a straddle-type vehicle other than a two-wheeled motorized vehicle such as, for example, an all terrain vehicle (ATV) or the like. Further, the vehicle may be a vehicle other than a straddle type vehicle, such as a four-wheeled motorized vehicle.

Motorcycle 1 is described as having a belt type CVT. However, the invention is not so limited and can be a vehicle having no CVT. Further, the vehicle may have a CVT which is not a belt type, such as a toroidal type CVT or the like.

<<Detailed Description of Motorcycle 1>>

(General Construction of Two-Wheeled Motorized Vehicle 1)

FIG. 1 is a side view of vehicle 1. Vehicle 1 has an engine unit 2 suspended from a body frame. A rear wheel 3 provided at a rear end of engine unit 2 is a drive wheel for driving a wheel with power outputted from engine unit 2.

Front forks 5 are connected to a bottom end of a head pipe extending downward from steering handlebars 4. A front wheel 6 rotatably attached to lower ends of front forks 5 is not connected to engine unit 2 and is a driven wheel.

Motorcycle 1 has a center stand 8 which brings motorcycle 1 to a standstill state under a condition that rear (drive) wheel 3 is spaced from the ground.

(Construction of Engine Unit 2)

A structure of engine unit 2 is now described with reference to FIGS. 2-4.

—Construction of Engine 10—

Figure 2:
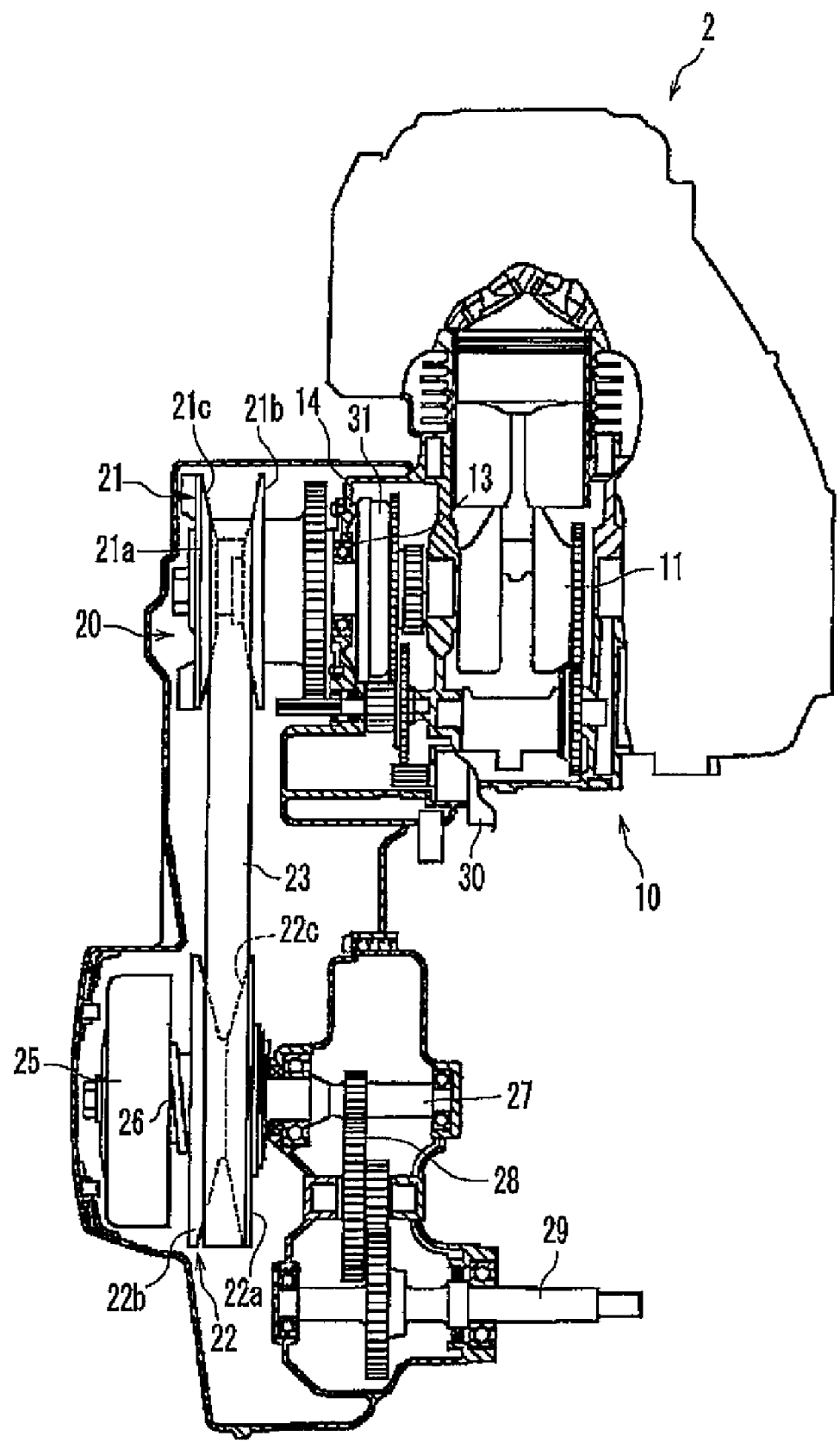
FIG. 2 is a sectional view of an engine unit of the vehicle.
Figure 3:
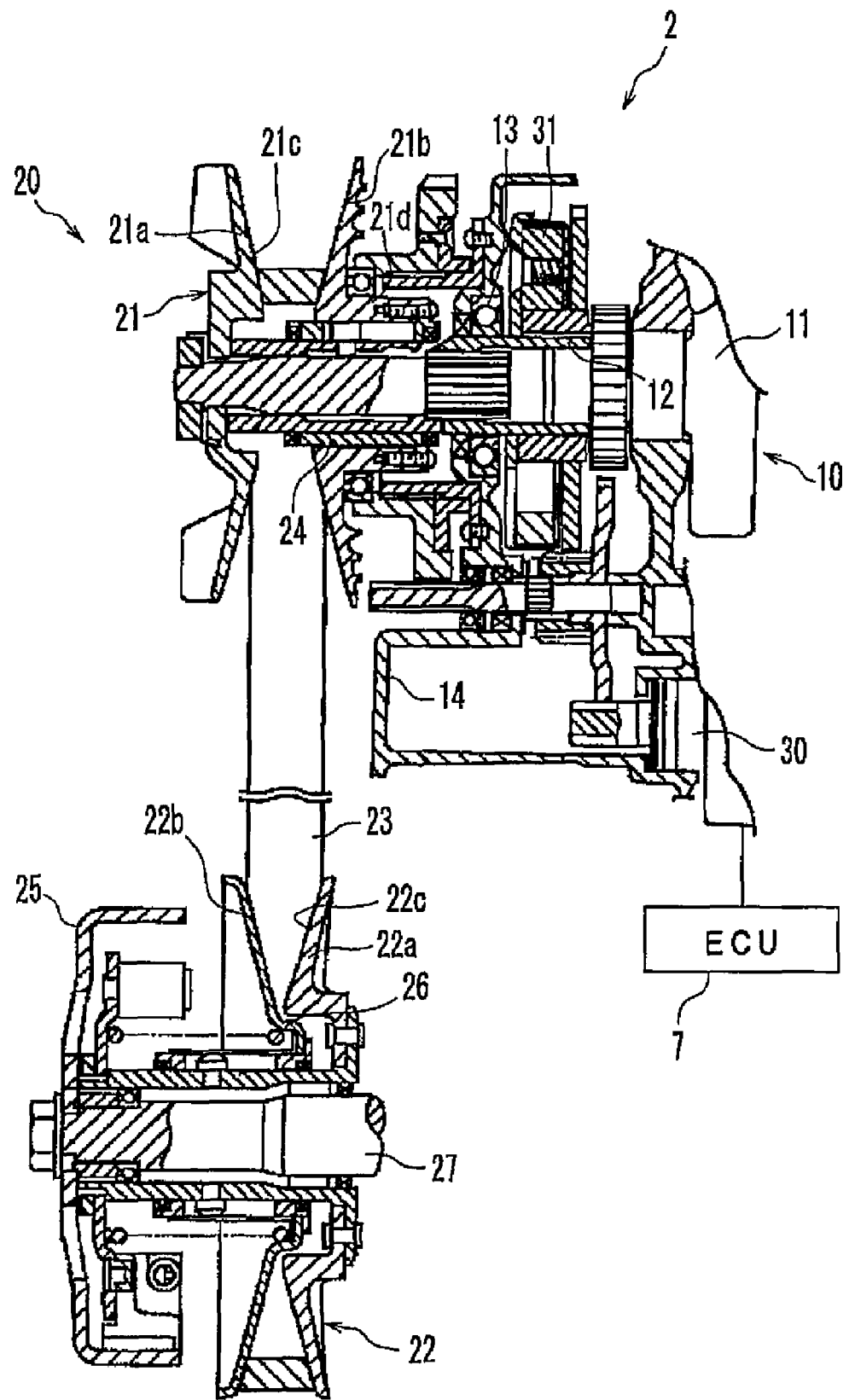
FIG. 3 is a partial cross sectional view showing a CVT of the vehicle.

As shown in FIGS. 2 and 3, engine unit 2 includes an internal combustion engine 10 and a transmission 20. While engine 10 is described as a forced-air-cooled four-stroke engine, it may be another type of engine such as a water-cooled engine or a two-stroke engine.

As shown in FIG. 3, engine 10 has a crankshaft 11. A sleeve 12 is spline-fitted onto an outer circumference of crankshaft 11 and rotatably supported by a housing 14 via a bearing 13. A one-way clutch 31 connected to an electric motor 30 is attached to an outer circumference of sleeve 12.

—Structure of ISC Device 9—

Figure 4:
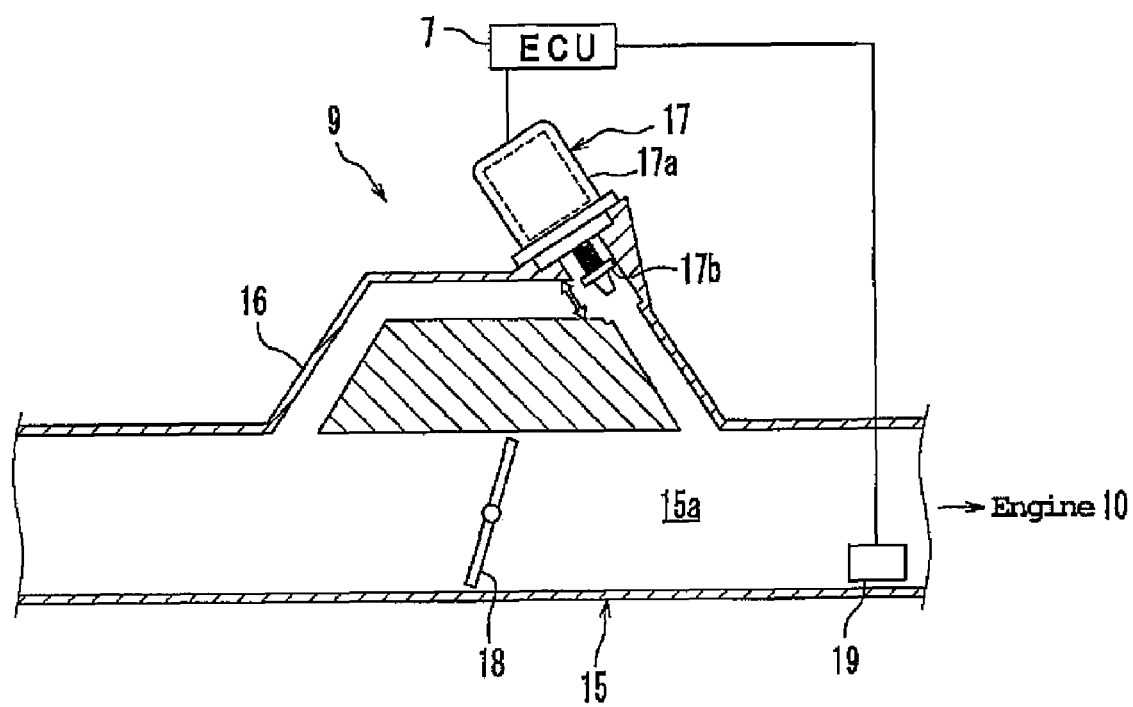
FIG. 4 is a cross sectional view of an intake pipe of an engine of the vehicle.

FIG. 4 is a cross sectional view of an intake pipe 15 that supplies air to engine 10. A throttle (intake) valve 18 disposed in intake pipe 15 adjusts an amount of air flowing through intake pipe 15 by adjusting a flow passage area of intake pipe 15. Throttle valve 18 opens when a throttle lever is moved toward an opening position and the amount of air flowing through intake pipe 15 increases.

A throttle valve opening sensor 18a (FIG. 5) attached to throttle valve 18 detects an opening of throttle valve 18.

An intake pipe pressure sensor 19 is disposed in intake pipe 15 at a downstream location 15a closer to engine 10 than throttle valve 18. Intake pipe pressure sensor 19 detects a pressure at downstream location 15a and outputs the detected pressure as an intake pipe pressure to an electronic control unit (ECU) 7.

An idle speed control (ISC) device 9 that controls an idling engine speed of motorcycle 1 by controlling the amount of air flowing through intake pipe 15 is attached to intake pipe 15. ISC device 9 includes a bypass pipe 16, an air amount adjusting unit 17 and ECU 7. Bypass pipe 16 bypasses the portion of intake pipe 15 where throttle valve 18 is disposed. In other words, bypass pipe 16 connects a portion of intake pipe 15 upstream from throttle valve 18 with a portion of intake pipe 15 downstream from throttle valve 18. Air amount adjusting unit 17 controls the amount of air flowing through intake pipe 15 by controlling a flow passage area of bypass pipe 16. Air amount adjusting unit 17 includes a bypass pipe valve 17b positioned in bypass pipe 16 and actuated by an actuator 17a. Bypass pipe valve 17b adjusts the amount of air flowing through bypass pipe 16 by adjusting a flow passage area of bypass pipe 16. Actuator 17a can be formed with, for example, a stepping motor or the like.

—Construction of Transmission 20—

In this embodiment, transmission 20 is a belt type, electronically controlled CVT (ECVT). However, transmission 20 is not limited to a belt type ECVT. For example, transmission 20 can be a mechanical type belt type CVT using centrifugal weights or a toroidal type CVT. Further, transmission 20 can be a gear type transmission.

Transmission 20 includes a V-belt 23 wrapped around a primary sheave 21 and a secondary sheave 22. V-belt 23 can be a rubber belt type, resin block belt type and the like.

Primary sheave 21 rotates together with crankshaft 11. Primary sheave 21 includes a fixed sheave half 21a fixed to one end of crankshaft 11 and a movable sheave half 21b opposed to fixed sheave half 21a. Movable sheave half 21b is movable in the axial direction of crankshaft 11. Opposing surfaces of fixed sheave half 21a and movable sheave half 21b form a belt groove 21c into which V-belt 23 is wrapped. As shown in FIG. 3, movable sheave body 21b has a cylindrical boss section 21d through which crankshaft 11 passes. A cylindrical slider 24 is fixed to an inner surface of boss section 21d. Movable sheave half 21b integral with slider 24 is movable in the axial direction of crankshaft 11. Accordingly, a width of belt groove 21c is variable.

Secondary sheave 22 is located at the rear of primary sheave 21 and is mounted to a driven shaft 27 via a centrifugal clutch 25. Secondary sheave 22 includes a fixed sheave half 22a opposed to a movable sheave half 22b. Fixed sheave half 22a is connected to driven shaft 27 via centrifugal clutch 25. Movable sheave half 22b is movable in the axial direction of driven shaft 27. Opposing surfaces of fixed sheave half 22a and movable sheave half 22b form a belt groove 22c into which V-belt 23 is wrapped.

Centrifugal clutch 25 is engaged and disengaged according to the rotational speed of fixed sheave half 22a. When the rotational speed of fixed sheave half 22a is less than a predetermined rotational speed, centrifugal clutch 25 is not engaged and rotation of fixed sheave body 22a is not transmitted to driven shaft 27. On the other hand, when the rotational speed of fixed sheave half 22a is equal to or more than the predetermined rotational speed, centrifugal clutch 25 is engaged and rotation of fixed sheave body 22a is transmitted to driven shaft 27.

Movable sheave half 22b is urged by a spring 26 in a direction to decrease a width of belt groove 22c. Because of this force, V-belt 23 is pulled toward the center in a radial direction at secondary sheave 22 when the groove width of belt groove 21C becomes smaller and a winding diameter of V-belt 23 relative to primary sheave 21 becomes larger. Thus, movable sheave half 22b moves against the urging force of spring 26 in a direction to increase the width of belt groove 22c. Therefore, the diameter with which V-belt 23 is wrapped around secondary sheave 22 decreases.

The groove width of belt groove 21c is changeable by electric motor 30 such that movable sheave body 21b is moved in the axial direction of crankshaft 11. Electric motor 30 can also be used as a self starter motor.

Driven shaft 27 is connected to an axle 29 via a deceleration mechanism 28. Rear wheel 3 is mounted to axle 29. Therefore, as driven shaft 27 rotates, axle 29 and rear wheel 3 rotate together.

(System for Controlling Vehicle 1)

A system for controlling vehicle 1 is described in detail with reference to FIG. 5. ECU 7 is a controlling unit that controls transmission 20, engine 10, etc.

—Control of Transmission 20—

Figure 5:
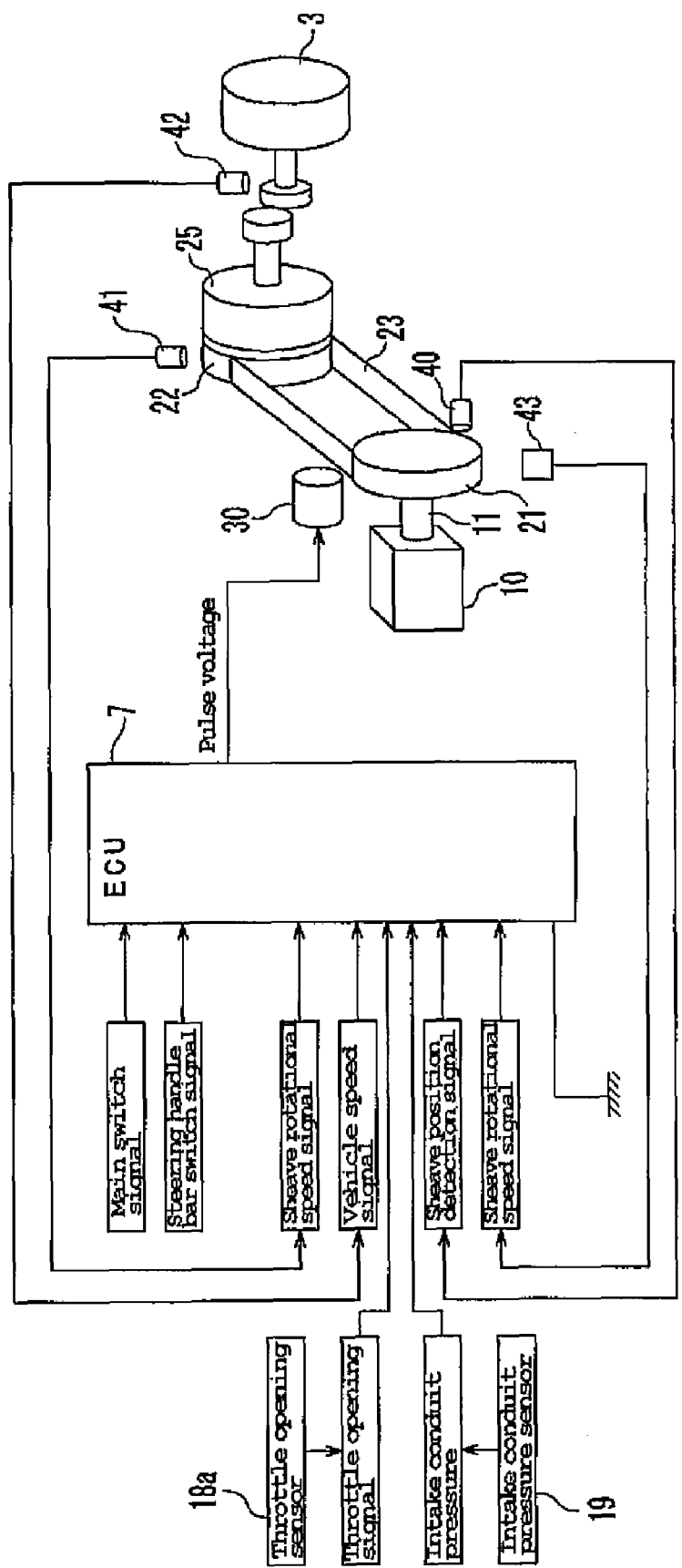
FIG. 5 is a block diagram of a system for controlling the vehicle.

As shown in FIG. 5, a sheave position sensor 40 connected to ECU 7 detects a position of movable sheave body 21b of primary sheave 21 and outputs the detected position of movable sheave body 21b as a sheave position detection signal. Sheave position sensor 40 may be formed by a potentiometer, for example.

A primary sheave rotation sensor 43, a secondary sheave rotation sensor 41 and a vehicle speed sensor 42 are connected to ECU 7. Primary sheave rotation sensor 43 detects a rotational speed of primary sheave 21 and outputs the detected rotational speed of primary sheave 21 to ECU 7 as a sheave rotational speed signal. A secondary sheave rotation sensor 41 detects a rotational speed of secondary sheave 22 and outputs the detected rotational speed of secondary sheave 22 to ECU 7 as a sheave rotational speed signal. Vehicle speed sensor 42 detects the rotational speed of rear wheel 3 and outputs to ECU 7 a vehicle speed signal based on the detected rotational speed.

A handlebar switch attached to steering handlebars 4 is connected to ECU 7 and outputs a handlebar SW signal when operated.

As described above, a throttle opening sensor 15a outputs a throttle opening signal to ECU 7.

Figure 6:
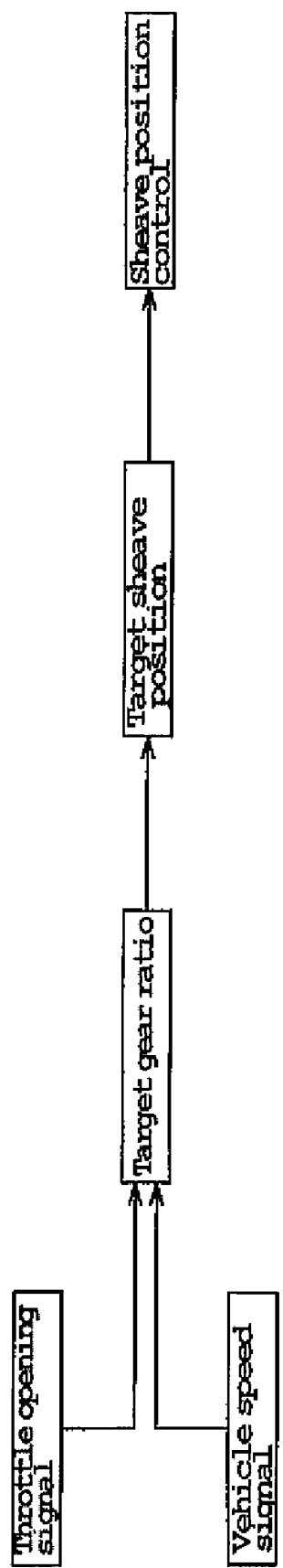
FIG. 6 is a block diagram illustrating sheave position control in the vehicle.

ECU 7 controls the sheave position of movable sheave body 21b of primary sheave 21 based on the vehicle speed signal. As shown in FIG. 6, ECU 7 determines a target gear ratio based on the throttle opening and vehicle speed. ECU 7 calculates a target sheave position based on the determined target change-gear ratio. The sheave position of movable sheave body 21b of primary sheave 21 is controlled in accordance with the calculated target sheave position.

Electric motor 30 is not limited to a particular drive method. In this embodiment, electric motor 30 is operated using pulse width modulation (PWM). ECU 7 has a drive circuit of electric motor 30 and a central processing unit (CPU) outputting a signal to the drive circuit. The CPU outputs a PWM signal to the drive circuit, which applies a pulse voltage corresponding to the PWM signal to drive electric motor 30. However, electric motor 30 can be a step motor type.

—ISC Control—

Idle speed control (ISC) feed back (ISC F/B) control changes the speed of engine 10 in the idling state. ISC F/B control, for example, increases idling rotational speed to warm up the engine earlier at idle. ECU 7 calculates a target amount of intake air of engine 10 based on various conditions, objects, etc. described above. Actuator 17a actuates bypass pipe valve 17b in accordance with the calculated target intake air amount. Thereby, the flow passage area of bypass pipe 16 changes and the intake air amount to engine 10 is adjusted.

ISC F/B control is described in more detail with reference to the flowchart of FIG. 7. In step S1, it is determined whether an intake air amount increase abnormality of ISC device 9 exists, based on the intake pipe pressure detected by intake pipe pressure sensor 19. More specifically, in step S1, it is determined whether the following conditions (a), (b) and (c) are continuously satisfied for a predetermined period or longer. If all of the conditions are satisfied, an intake air amount increase abnormality of ISC device 9 is determined. The predetermined period for satisfaction of conditions (a)-(c) is determined in accordance with a model of motorcycle 1 or the like. For example, the predetermined period necessary for satisfaction of conditions (a)-(c) can be approximately five to ten seconds.

(a) the throttle opening$\leqq$A
(b) B<the engine speed
(c) the intake pipe pressure>C Condition (a) determines whether the throttle opening is substantially closed. "A" designates an ISC F/B control allowable opening and is set in accordance with a model or settings of motorcycle 1 or the like. If the throttle opening is larger than the opening "A," it is determined that the rider is going to open the throttle valve. Therefore, it is not a problem that the intake air amount increases, and restriction of ISC F/B control is not needed. Accordingly, condition (a) is a determination condition of an intake air amount increase abnormality of ISC device 9.

In step S1, condition (c) is a substantial determination condition of the intake air amount increase abnormality of ISC device 9. The inventors determined that the intake air amount of ISC device 9 and the intake pipe pressure are interrelated, and that the intake pipe pressure becomes larger than a normal intake pipe pressure when an abnormal increase of intake air amount occurs. As a result, condition (c) is a substantial determination condition of an intake air amount increase abnormality of ISC device 9. Additionally, while condition (c) is a function of engine speed in this embodiment, condition (c) can also be an invariable.

Figure 8:
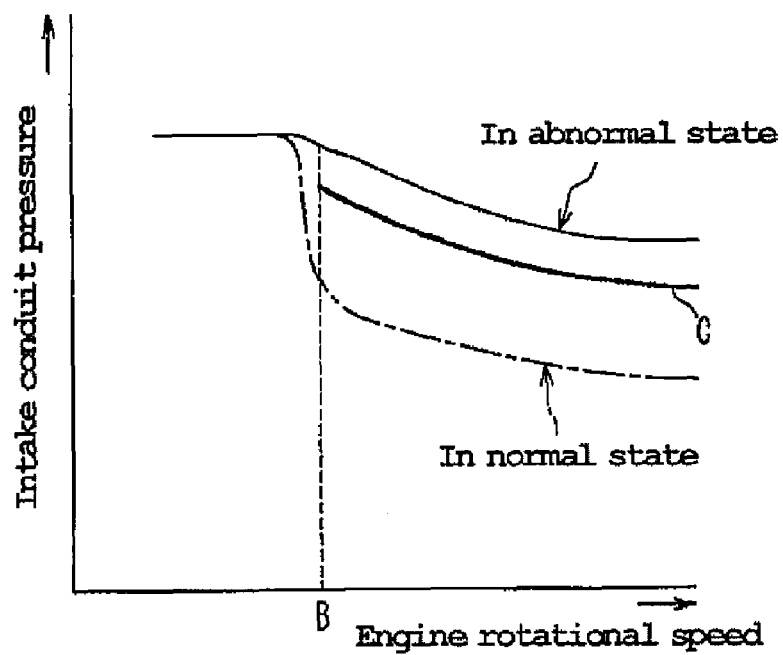
FIG. 8 is a graph showing relationships between intake pipe pressures and engine speeds in the vehicle.

The chain line of FIG. 8 indicates a normal state of ISC device 9. The solid thin line indicates an abnormal state of ISC device 9. The solid thick line indicates pressure "C" of condition (c). As shown in FIG. 8, intake pipe pressure sharply decreases when engine speed becomes higher than a certain rotational speed in the normal state of ISC device 9. This is because bypass pipe 16 is closed with the increase of engine speed. Thus, if an abnormality occurs on ISC device 9 and bypass pipe valve 17b continuously opens even though engine speed increases, intake pipe pressure does not rapidly decrease. Therefore, as shown in FIG. 8, if "C" is set to be an intake pipe pressure slightly less than the intake pipe pressure in the abnormal state of ISC device 9, an intake air amount increase abnormality can be detected by condition (c).

"B" of condition (b) is provided to avoid an erroneous determination. That is, even though ISC device 9 is normal, a condition such that the engine speed is relatively higher than the engine speed in the normal idling state can continue immediately after the start of engine 10 or when engine 10 has not yet been warmed up, although the engine does not reach a state such that the engine speed at idle becomes close to the maximum speed. A difference between the intake pipe pressure under the circumstances and the intake pipe pressure in the abnormal state of ISC device 9 is small. Accordingly, there is a risk that an abnormality of ISC device 9 is erroneously determined. In other words, an abnormality of ISC device 9 can be detected immediately after the start of engine 10 or when engine 10 has not yet been warmed up, even though there is no abnormality of ISC device 9. Therefore, condition (b) prevents an abnormality determination of ISC device 9 before the engine reaches a speed at which an abnormality of ISC device 9 is surely determined.

Rotational speed "B" is normally set in a range where the difference between the intake pipe pressure when ISC device 9 is normal and the intake pipe pressure when ISC device 9 is abnormal is larger, and to be in close proximity to the maximum rotational speed that is barely determined to be in the idling state.

If conditions (a), (b) and (c) are continuously satisfied for the predetermined period or longer in step S1, an intake air amount increase abnormality of ISC device 9 is determined. As shown in FIG. 7, if an intake air amount increase abnormality of ISC device 9 is determined, a vehicle speed condition neglect flag is set to be "ON" in step S2. On the other hand, if an intake air amount increase abnormality of ISC device 9 is not determined in step S1, the vehicle speed condition neglect flag is not set to be "ON" and remains "OFF."

Step S3 determines whether the vehicle speed condition neglect flag is "ON", that is, whether an intake air amount increase abnormality of ISC device 9 has occurred. If the vehicle speed condition neglect flag is "ON," the method proceeds to step S4-1, and if the vehicle speed condition neglect flag is still "OFF", the method goes to step S4-2.

Step S4-1 is performed when an intake air amount increase abnormality of ISC device 9 is detected and determines whether the following conditions (a), (d) and (e) are continuously satisfied for a predetermined period or longer. The predetermined period for satisfaction of conditions (a), (d) and (e) is set in accordance with a model of motorcycle 1 or the like. For example, the predetermined period for satisfaction of conditions (a), (d) and (e) can be approximately five to ten seconds.

(a) the throttle opening $\leqq$ A
(d) the engine speed>D
(e) the fuel cut control is not under execution Condition (a) of step S4-1 is the same as condition (a) of step S1.

"D" in condition (d) designates a rotational speed of engine 10 when centrifugal clutch 25 is switched to the connected state from the disconnected state. That is, condition (d) is a condition that centrifugal clutch 25 is connected. Condition (d) may not always be determined in step S4-1. If ISC F/B control is not desired when centrifugal clutch 25 is disconnected, condition (d) is preferably provided in step S4-1.

Condition (e) is also not always required. However, by providing condition (e) in step S4-1, ISC F/B control under fuel cut control can be restricted. If ISC F/B control is performed during a period that fuel cut control is made for another control purpose, the engine speed excessively decreases and the engine can stall. Condition (e) thus is preferably provided in step S4-1.

If conditions (a), (d) and (e) are continuously satisfied for the predetermined period or longer in step S4-1, the rotational speed of engine 10 is inhibited from increasing in step S5. Means for inhibiting the rotational speed of engine 10 from increasing is not limited to any particular one. For example, reducing supplied fuel and/or delaying ignition times or the like can inhibit the rotational speed of engine 10 from increasing.

On the other hand, if conditions (a), (d) and (e) are not continuously satisfied for the predetermined period, the program ends without inhibiting the rotational speed.

If the vehicle speed neglect flag is "OFF" in step S3, it is determined that there is no intake air amount abnormality of ISC device 9, and the method goes to step S4-2. Step S4-2 determines whether the motorcycle is running by inertia, i.e., at a relatively slow speed because of the substantial close of the throttle valve. If it is determined in step S4-2 that the motorcycle is running by inertia, i.e., at a relatively slow speed, engine speed is suppressed in step S5. Therefore, the fuel efficiency of the motorcycle running by inertia is improved. On the other hand, if it is not determined that the motorcycle is running by inertia at a relatively slow speed in step S4-2, the program is terminated without suppression of engine speed.

The following conditions (a), (f), (d) and (e) are determined in step S4-2.

(a) the throttle opening $\leqq$ A
(f) the vehicle speed<E
(d) the engine speed>D
(e) fuel cut control is not under execution Condition (a) is the same as condition (a) of step S1. Conditions (d) and (e) are the same as conditions (d) and (e)

of step S4-1. Condition (V avoids suppression of engine speed when the vehicle speed is overly fast.

<<Action and Effect>>

As thus described, vehicle speed sensor 42 detects a rotational speed of rear (drive) wheel 3 to obtain a vehicle speed. The vehicle speed is thus precisely detected and control of motorcycle 1 using vehicle speed can be performed more accurately. Thus, in this embodiment, control of the gear ratio of transmission 20 can be performed more accurately.

In this embodiment, an intake air amount increase abnormality of ISC device 9 can be detected without using vehicle speed. Therefore, an abnormality of ISC device 9 can be properly determined anytime, for example, when the vehicle is in an idling state in which rear wheel 3 is spaced from the ground because center stand 8 is erected.

In this embodiment, no sensor for detecting the use of center stand 8 or any additional vehicle speed sensors are required to detect an abnormality of ISC device 9. Accordingly, motorcycle 1 has a simple and inexpensive structure.

Vehicle speed sensor 42 detects the rotational speed of rear wheel 3 and an abnormality of ISC device 9 is detected based on intake pipe pressure; thereby, both precise detection of vehicle speed and accurate control of motorcycle 1 and accurate abnormality detection of ISC device 9 are realized with a simple and inexpensive structure.

When an abnormality of ISC device 9 is detected, engine speed is inhibited from increasing in principle, unless any fuel cut control is performed in another control process. Thereby, excessive increase of engine speed is avoided and fuel consumption is improved.

Figure 7:
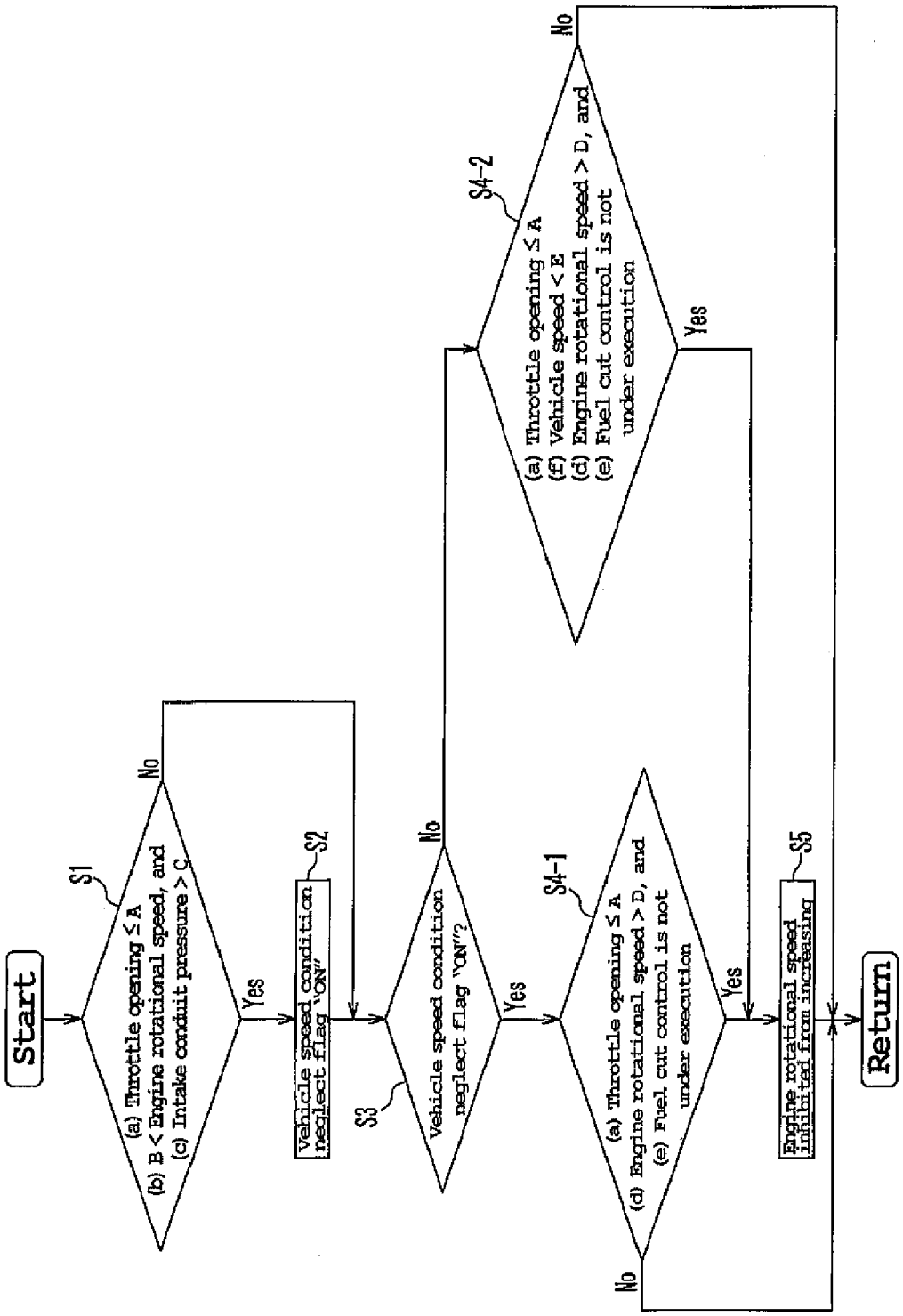
FIG. 7 is a flowchart of ISC F/B control in the vehicle.

Also, as shown in FIG. 7, whether the engine speed is higher than predetermined rotational speed B is determined in step S1. Thereby, as described above, precise detection of an intake air amount increase abnormality of ISC device 9 is practicable. In other words, erroneous detection of an intake air amount increase abnormality of ISC device 9 is restricted.

If conditions (a), (b) and (c) are continuously satisfied for the predetermined period or longer in step S1, an intake air amount increase abnormality of ISC device 9 is detected; thereby, erroneous detection of an intake air amount increase abnormality of ISC device 9 is effectively restricted. If any abnormality occurs with ISC device 9, conditions (a), (b) and (c) are normally continuously satisfied for the predetermined time or longer. If conditions (a), (b) and (c) are satisfied only for a moment, no abnormality of ISC device 9 has likely occurred. Therefore, continuous satisfaction of conditions (a)-(c) for the predetermined period or longer is preferably a condition for an abnormality determination of ISC device 9.

Because condition (d) is determined in step S4-1, suppression of engine speed that is a relatively low rotational speed at which centrifugal clutch 25 is not connected is restricted. As a result, only the situation in which the rotational speed of rear wheel 3 increases due to an intake air amount increase abnormality of ISC device 9 is accurately prevented from occurring.

Also, if step S4-2 determines that conditions (a), (f), (d) and (e) are satisfied when an abnormality of ISC device 9 is not determined, engine speed is inhibited from increasing in step S5. Thereby, excessive increase of engine speed when motorcycle 1 is running by inertia is inhibited and fuel consumption is improved.

<<Modification 1>>

Figure 9:
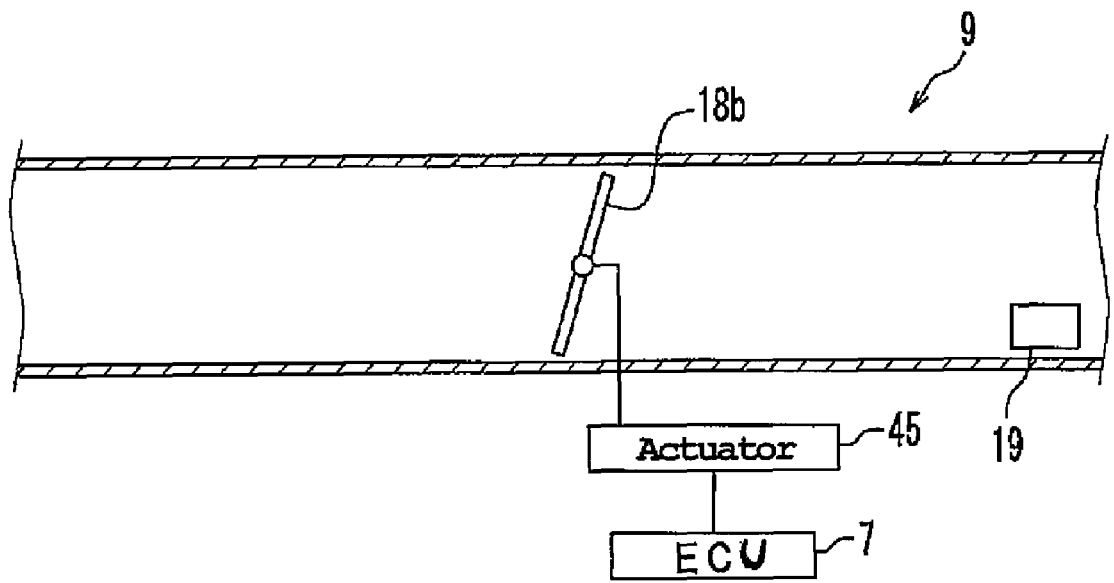
FIG. 9 is a cross sectional view of an intake pipe of the engine in a variation 1 of the invention.

An embodiment of the invention in a motorcycle 1 equipped with ISC device 9 having bypass pipe 16 has been described as an example. However, the invention is not limited to an ISC device having a bypass pipe. For example, as shown in FIG. 9, ISC device 9 can use an electronic control type throttle valve 18b actuated by actuator 45. In ISC device 9 of FIG. 9, an opening of throttle valve 18b is electronically controlled by ECU 7.

<<Modification 2>>

Figure 10:
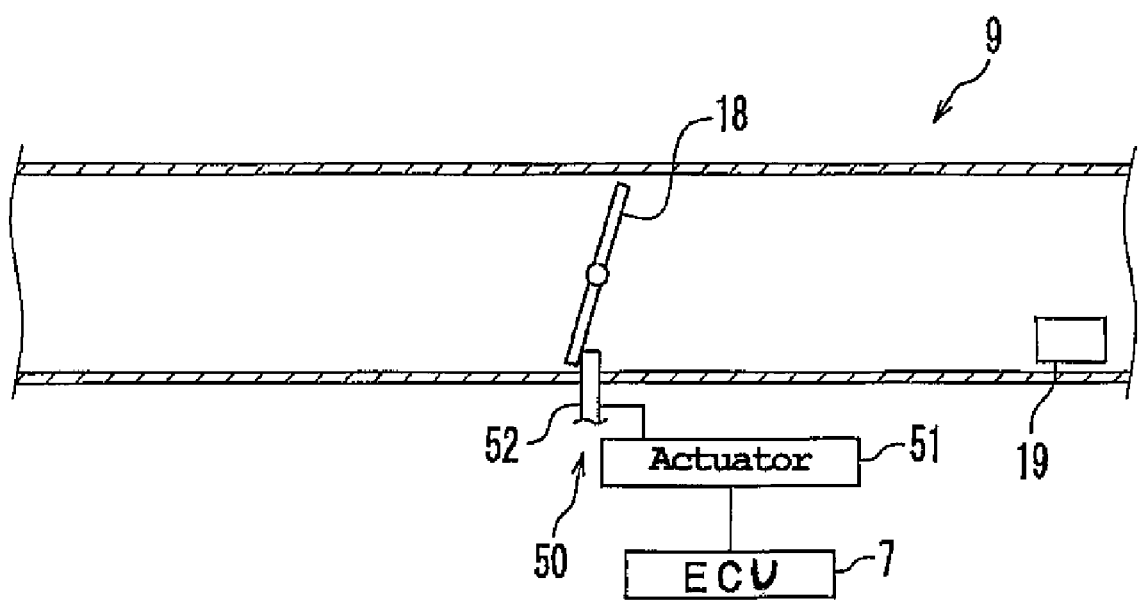
FIG. 10 is a cross sectional view of an intake pipe of the engine in a variation 2 of the invention.

As shown in FIG. 10, ISC device 9 can be formed with a throttle opening adjusting unit 50 which is not an electronic control type but compulsorily adjusts the opening of throttle valve 18, and ECU 7. Throttle opening adjusting unit 50 can be formed with, for example, a push member 52 pushing throttle valve 18 and an actuator 51 actuating push member 52. For example, throttle opening adjusting unit 50 can be formed with a solenoid element.

Embodiment 2

Figure 11:
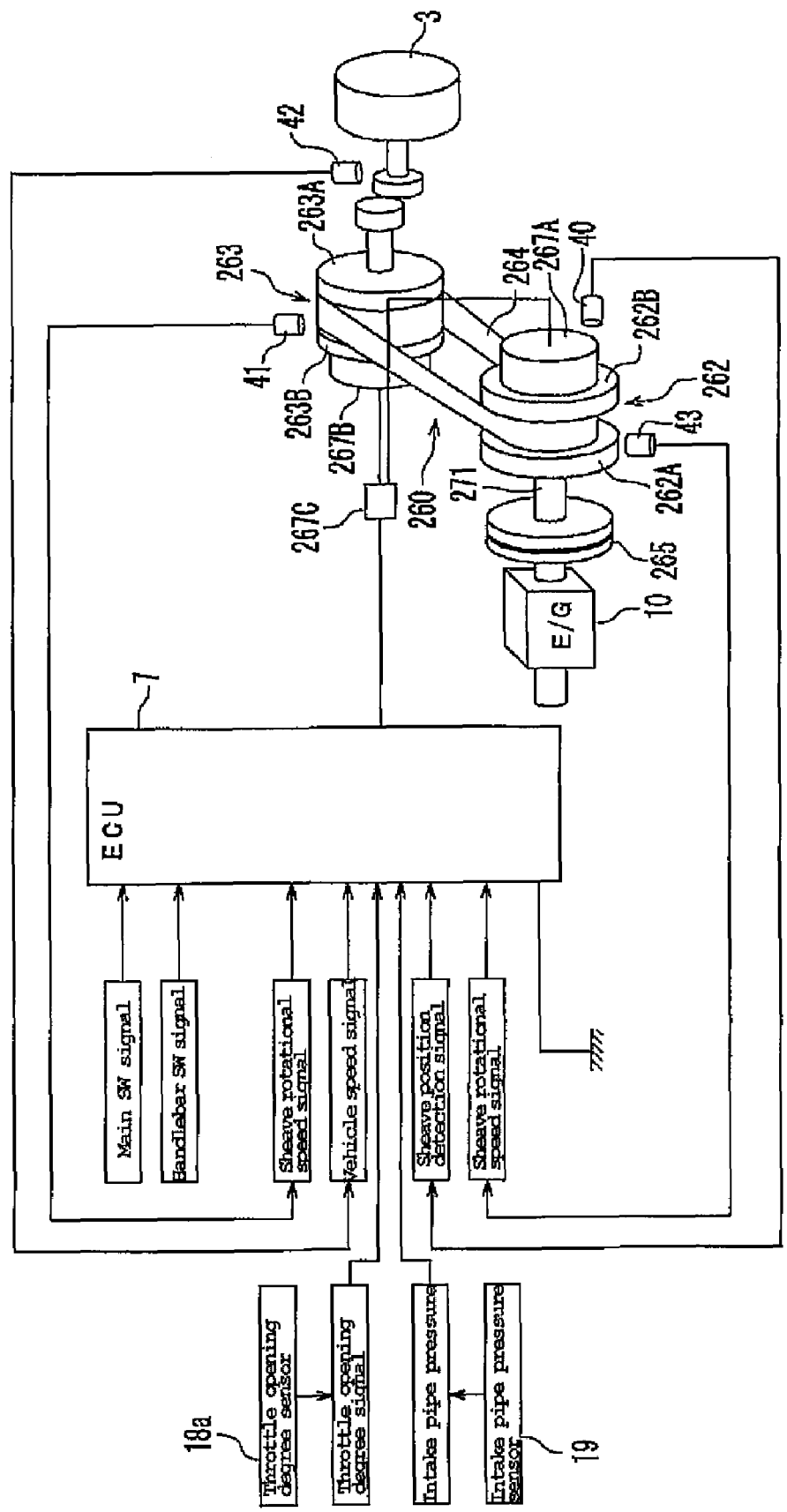
FIG. 11 is a block diagram of a controller in accordance with a second embodiment of the invention.

FIG. 11 is a block diagram of a system for controlling a vehicle in accordance with a second embodiment of the invention (embodiment 2). In embodiment 2, variable transmission 260 is a belt type ECVT having a so-called metal belt 264.

The actuator of ECVT in embodiment 1 is electric motor 30. However, the actuator of ECVT is not limited to an electric motor. The actuator of ECVT in embodiment 2, for example, is a hydraulic actuator.

In embodiment 1, the clutch is a centrifugal clutch 25 located between driven (output) shaft 27 of variable transmission 20 and rear (drive) wheel 3 and mechanically engaged or disengaged depending on the rotational speed of engine 10. However, the clutch of embodiment 2 is located between engine 10 and input shaft 271 of variable transmission 260 and controlled to be engaged or disengaged depending on the rotational speed of engine 10. Specifically, in embodiment 2, electrically controlled multiple friction clutch 265 is used as a clutch.

As shown in FIG. 7, the vehicle of embodiment 2 includes electrically controlled multiple friction clutch 265 and ECVT type variable transmission 260. Variable transmission 260 includes a metal belt 264 wound around a primary sheave 262 and a secondary sheave 263. Primary sheave 262 includes fixed sheave half 262A and movable sheave half 262B. Secondary sheave 263 includes fixed sheave half 263A and movable sheave half 263B.

A primary sheave rotation sensor 43 is equipped to primary sheave 262. A secondary sheave rotation sensor 41 is equipped to secondary sheave 263.

The vehicle includes a hydraulic control valve 267C connected to hydraulic cylinders 267A and 267B. Hydraulic cylinder 267A adjusts the groove width of primary sheave 262 by driving movable sheave half 262B. Hydraulic cylinder 267B adjusts the groove width of secondary sheave 263 by driving movable sheave half 263B. Hydraulic control valve 267C adjusts the hydraulic pressure applied to hydraulic cylinders 267A and 267B. Hydraulic control valve 267C controls hydraulic cylinders 267A and 267B such that when one of them has higher hydraulic pressure the other has lower hydraulic pressure. Hydraulic control valve 267C is controlled by ECU 7.

Multiple friction clutch 265 is located between engine 10 and input shaft 271 of variable transmission 260, and is controlled depending on the rotational speed of engine 10 ("engine rotational speed"). For example, multiple friction clutch 265 is controlled to be connected when the engine speed is beyond the predetermined value and disconnected when the engine speed is below the predetermined value.

The control and abnormality detection of embodiment 1 are also performed in embodiment 2. In embodiment 1, D of condition (d) in step S4-1 (see FIG. 7) in ISC F/B control indicates the rotational speed of engine 10 when centrifugal clutch 25 comes to be engaged from the disengaged state. In embodiment 2, D described above indicates the rotational speed of engine 10 when multiple friction clutch 265 comes to be engaged from the disengaged state.

Embodiment 2 obtains the same effect as in embodiment 1.

<<Other Variations>>

The vehicle of the present invention may be a vehicle other than a scooter-type vehicle such as an off-road type, a motorcycle type, a scooter type or a moped type. Also, the vehicle may be a straddle-type vehicle other than a two-wheeled motorized vehicle, such as an all terrain vehicle (ATV) or the like. Further, the vehicle may be a vehicle other than a straddle type vehicle, such as a four-wheeled motorized vehicle.

The vehicle according to the present invention can be a vehicle having no CVT. Also, transmission 20 can be, for example, a mechanical type belt type CVT using centrifugal weights or a toroidal type CVT. Further, transmission 20 can be a gear type transmission.

Engine 10 can be a type of engine other than a forced air-cooled, four-stroke engine. For example, engine 10 may be a water-cooled engine or a two-stroke engine.

A clutch regulated by an actuator or the like may be provided in place of centrifugal clutch 25, such that the clutch is engaged or disengaged in accordance with a detection value of the rotational speed of engine 10.

Vehicle speed sensor 42 can be a sensor which detects a rotational speed of driven shaft 27, calculates a rotational speed of rear wheel 3 from the detected rotational speed of driven shaft 27 and outputs a vehicle speed signal to ECU 7 based on the calculated rotational speed of rear wheel 3.

In the above embodiment, intake pipe pressure sensor 19 is positioned at a location closer to engine 10 than the portion of intake pipe 15 coupled with the downstream portion of the bypass pipe. Intake pipe pressure sensor 19, however, is only required to be positioned to be able to detect pressure of downstream location 15a. For example, intake pipe pressure sensor 19 can be positioned at a location spaced apart from engine 10 more than the portion of intake pipe 15 coupled with the downstream portion of the bypass pipe. Also, intake pipe pressure sensor 19 can be placed out of intake pipe 15.

Condition (b) of step S1 of FIG. 7 is dispensable.

Conditions (d) and (e) of step S4-1 of FIG. 7 are dispensable.

Rear (drive) wheel 3 can be directly coupled with driven (output) shaft 27. Alternatively, rear wheel 3 can be indirectly coupled with driven shaft 27 through reduction mechanism 28, axle 29 or the like, as described in the above embodiment.

<<Definition of Terms in the Specification>>

The term "idling rotational speed" means an engine speed of a vehicle at idle.

The phrase "the intake pipe pressure is high" means that an absolute pressure in the intake pipe is high. In other words, a negative pressure in the intake pipe is small.

"Clutch engaged or disengaged according to the rotational speed" includes a clutch that is controlled to be engaged or disengaged according to rotational speed as well as a centrifugal clutch that is mechanically engaged or disengaged according to rotational speed.

The present invention is useful for vehicles such as a straddle type vehicle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A vehicle comprising:
an engine;
a drive wheel driven by power of the engine;
a vehicle speed sensor for detecting a rotational speed of the drive wheel;
an intake pipe for supplying air to the engine;
an intake pipe pressure sensor for detecting pressure in the intake pipe;
an intake valve located further apart from the engine than the intake pipe pressure sensor in the intake pipe for adjusting a flow passage area of the intake pipe;
an idle speed control device for performing an idle speed control that controls an idling rotational speed by controlling an amount of air flowing through the intake pipe; and
a controlling unit for detecting an abnormality in the idle speed control device based on the pressure in the intake pipe detected by the intake pipe pressure sensor, and suppressing an increase of engine speed when an abnormality in the idle speed control device is detected.

2. The vehicle according to claim 1, wherein the idle speed control device includes:
a bypass pipe for connecting an upstream side and a downstream side of the intake valve of the intake pipe; and
a bypass pipe valve for controlling the amount of air flowing in the intake pipe by controlling a flow passage area of the bypass pipe.

3. The vehicle according to claim 1, wherein the controlling unit detects an abnormality of the idle speed control device when the pressure in the intake pipe detected by the intake pipe pressure sensor is higher than the predetermined pressure.

4. The vehicle according to claim 3, wherein the controlling unit detects that the idle speed control device is abnormal if
a condition that the pressure in the intake pipe detected by the intake pipe pressure sensor is higher than the predetermined pressure is continuously detected for a predetermined period or longer.

5. The vehicle according to claim 1, wherein the controlling unit detects that the idle speed control device is abnormal if
the pressure in the intake pipe detected by the intake pipe pressure sensor is higher than a predetermined pressure,
a throttle opening is equal to or less than a predetermined opening, and
the rotational speed of the engine is equal to or higher than a predetermined rotational speed.

6. The vehicle according to claim 1, further comprising a stand for lifting the drive wheel off the ground.

7. A vehicle comprising:
an engine;
an electronic continuously variable transmission having an input shaft connected to the engine and an output shaft and capable of continuously controlling a transmission gear ratio between the input shaft and the output shaft;
a drive wheel connected to the output shaft;
a vehicle speed sensor for detecting a rotational speed of the drive wheel;
an intake pipe for supplying air to the engine;
an intake pipe pressure sensor detecting pressure in the intake pipe;
an intake valve located further apart from the engine than the intake pipe pressure sensor in the intake pipe for adjusting a flow passage area of the intake pipe;

an idle speed control device for performing an idle speed control that controls an idling rotational speed by controlling an amount of air flowing through the intake pipe; and a controlling unit for detecting an abnormality in the idle speed control device based on the pressure in the intake pipe detected by the intake pipe pressure sensor, and suppressing an increase of engine speed when an abnormality in the idle speed control device is detected.

8. The vehicle according to claim 7, further comprising
a clutch located between the output shaft and the drive wheel that is engaged or disengaged depending on the rotational speed of the engine,
wherein the controller suppresses increase of engine speed when a throttle opening is lower than a predetermined opening and the engine speed is higher than a rotational speed in which the clutch engages, after an abnormality in the idle speed control device is detected.

9. The vehicle according to claim 7, further comprising
a clutch located between the engine and the input shaft that is engaged or disengaged depending on the engine speed,
wherein the controlling unit suppresses increase of engine speed when a throttle opening is a predetermined opening or smaller and the engine speed is higher than a rotational speed in which the clutch engages, after an abnormality in the idle speed control device is detected.

10. The vehicle according to claim 7, further comprising
a clutch located between the output shaft and the drive wheel that is engaged or disengaged depending on the engine speed,
wherein the controlling unit suppresses increase of engine speed when an abnormality of the idle speed control device is not detected, and a throttle opening is a predetermined opening or smaller, a vehicle speed detected by the vehicle speed sensor is a predetermined vehicle speed or lower, and the engine speed is higher than a rotational speed in which the clutch engages.

11. The vehicle according to claim 7, further comprising
a clutch located between the engine and the input shaft that is engaged or disengaged depending on the rotational speed of the engine, and
wherein the controlling unit suppresses increase of engine speed when an abnormality of the idle speed control device is not detected, a throttle opening is a predetermined opening or smaller, a vehicle speed detected by the vehicle speed sensor is a predetermined vehicle speed or lower, and the engine speed is higher than a rotational speed in which the clutch engages.

12. A controller for a vehicle including an intake pipe for supplying air to an engine; an intake pipe pressure sensor; and an idle speed control device that controls an idling rotational speed by controlling the amount of air flowing through the intake pipe,
wherein the controller detects an abnormality of the idle speed control device based on a pressure in the intake pipe detected by the intake pipe pressure sensor, and suppresses increase of engine speed when an abnormality of the idle speed control device is detected.

13. An abnormality detection system for an idle speed control device in a vehicle including an intake pipe for supplying air to an engine and an intake pipe pressure sensor,
wherein an abnormality of the idle speed control device is detected based on a pressure in the intake pipe detected by the intake pipe pressure sensor.

14. A method of controlling a vehicle including an intake pipe for supplying air to an engine; an intake pipe pressure sensor; and an idle speed control that controls an idling rotational speed by controlling the amount of air flowing through the intake pipe, the method comprising:
detecting an abnormality of the idle speed control device based on a pressure in the intake pipe detected by the intake pipe pressure sensor, and
suppressing increase of engine speed when an abnormality of the idle speed control device is detected.

15. A method of detecting an abnormality of an idle speed control device in a vehicle including an intake pipe for supplying air to an engine and an intake pipe pressure sensor, the method comprising:
detecting an abnormality of the idle speed control device based on a pressure in the intake pipe detected by the intake pipe pressure sensor.

* * * * *